US012638581B2

(12) United States Patent
He et al.

(10) Patent No.: US 12,638,581 B2
(45) Date of Patent: May 26, 2026

(54) METHOD FOR CALCULATING FORWARD ACOUSTIC SCATTERING DOPPLER FREQUENCY SHIFT OF UNDERWATER MOVING TARGET UNDER IRREGULAR TRAJECTORY

(71) Applicant: INSTITUTE OF OCEANOGRAPHIC INSTRUMENTATION, SHANDONG ACADEMY OF SCIENCES, Qingdao (CN)

(72) Inventors: Chuanlin He, Qingdao (CN); Yang Yu, Qingdao City (CN); Shouyang Sun, Qingdao (CN); Jianbo Ma, Qingdao (CN); Hongmin Lv, Qingdao (CN)

(73) Assignee: INSTITUTE OF OCEANOGRAPHIC INSTRUMENTATION, SHANDONG ACADEMY OF SCIENCES, Qingdao (CN)

( * ) Notice: Subject to any disclaimer, the term of this patent is extended or adjusted under 35 U.S.C. 154(b) by 426 days.

(21) Appl. No.: 18/268,145

(22) PCT Filed: Feb. 16, 2022

(86) PCT No.: PCT/CN2022/076459
§ 371 (c)(1),
(2) Date: Jun. 16, 2023

(87) PCT Pub. No.: WO2022/233169
PCT Pub. Date: Nov. 10, 2022

(65) Prior Publication Data
US 2024/0295652 A1 Sep. 5, 2024

(30) Foreign Application Priority Data
May 6, 2021 (CN) .......................... 202110488392.0

(51) Int. Cl.
*G01S 15/58* (2006.01)
*G01S 15/00* (2020.01)

(52) U.S. Cl.
CPC ............ *G01S 15/58* (2013.01); *G01S 15/003* (2013.01)

(58) Field of Classification Search
CPC ......... G01S 15/58; G01S 15/003; G01S 7/539
(Continued)

(56) References Cited

U.S. PATENT DOCUMENTS 9,223,021 B2 * 12/2015 Goldman ................ G01S 15/66
2006/0109745 A1 5/2006 Bouyoucos et al.
2018/0143293 A1 * 5/2018 Yang ........................ G01S 5/30

FOREIGN PATENT DOCUMENTS

CN 105388470 A 3/2016
CN 106556827 A 4/2017
(Continued)

OTHER PUBLICATIONS

CN-106842128-A (machine translation) (Year: 2017).*
Zhao et al. ("An improved aerial target localization method with a single vector sensor." Sensors 17.11 (2017): 2619., "Zhao") (Year: 2017).*
(Continued)

*Primary Examiner* — Yuqing Xiao
*Assistant Examiner* — Christopher Richard Walker

(57) ABSTRACT
The invention involves a method for calculating a forward acoustic scattering Doppler frequency shift of an underwater moving target under an irregular trajectory, comprising: (1) converting earth longitude and latitude coordinates of a transmitting end, a target trajectory, and a receiving end into rectangular coordinates, and sequentially marking the coordinates as $(x_S, y_S)$, $(x_T, y_T)$, and $(x_R, y_R)$ (2) recording a target trajectory coordinate sequence as $(x_T(t_i), y_T(t_i))$, wherein i=1, 2, . . . , N, and calculating an average navigation speed $\bar{v}$ within all time periods. (3) performing smoothing processing on the target trajectory to obtain a
(Continued)

virtual straight trajectory, and respectively calculating horizontal distances from the target and the receiving end to an intersection of the virtual linear trajectory and a baseline, and an included angle between the virtual straight trajectory and the baseline; and (4) calculating the forward acoustic scattering Doppler frequency shift of the target at each time point by using the parameters calculated in steps (2) and (3).

4 Claims, 6 Drawing Sheets

(58) Field of Classification Search
USPC ........................................................... 367/9
See application file for complete search history.

(56) References Cited

FOREIGN PATENT DOCUMENTS

| CN | 106842128 | A | * | 6/2017 | .............. | G01S 5/18 |
|----|-----------|---|---|--------|-------------|-----------|
| CN | 113238208 | A |   | 8/2021 |             |           |

OTHER PUBLICATIONS

He et al. "Simultaneous detection of the acoustic-field aberration and Doppler shift in forward acoustic scattering." Chinese Physics B 26.1 (2017): 014301, "He") (Year: 2017).*
He Chuan-Lin et al., Researches on the acoustic field and signal extraction in forward scateering of underwater objects, Jan. 2017, 149 pgs.

* cited by examiner

METHOD FOR CALCULATING FORWARD ACOUSTIC SCATTERING DOPPLER FREQUENCY SHIFT OF UNDERWATER MOVING TARGET UNDER IRREGULAR TRAJECTORY

TECHNICAL FIELD

The invention involves the technical field of underwater acoustics, in particular a method for calculating the acoustic forward-scattering Doppler-shift of a submerged target intruding the transceiver line in an irregular trajectory.

BACKGROUND

Since the positions of the transmitter and receiver are fixed and only the target moves in the acoustic forward-scattering detection system, the target has a time-varying Doppler-shift while the direct-blast is zero in Doppler-shift. Therefore, the submerged target intruding the transceiver line can be detected by extracting the forward-scattering Doppler-shift from the received acoustic signal. However, the authenticity and accuracy of the extraction results of the forward-scattering Doppler-shift of the target need to be compared and validated by the corresponding theoretical calculation results.

There are two theoretical calculation methods for the acoustic forward-scattering Doppler-shift of a submerged moving target.

The first method utilizes the bistatic angle and the angle between the target heading direction and the bisector of the bistatic angle. Its expression is as follows:

$$f_d = \frac{2v}{\lambda}\cos\left(\frac{\beta}{2}\right)\cos\delta,$$

where v is the target velocity, $\lambda$ is the incidence wavelength, $\beta$ is the bistatic angle, $\delta$ is the angle between the target heading direction and the bisector of the bistatic angle. This method is essentially a geometric description. Its advantage is that it can calculate the forward-scattering Doppler-shift under any target movement mode, but it has two obvious shortcomings. One is that it is difficult to intuitively establish the corresponding relations between the Doppler-shift and the target parameters, and the description of the evolution process of the Doppler-shift with respect to the motion time is also not inadequately clear. The other is that the target heading angle record is a necessity. Otherwise, only given the target trajectory coordinate and velocity, multi-layer calculations are usually required to obtain the angle value $\delta$. Obviously, the more the numerical calculation layers, the greater the accumulation error, and the worse the calculation accuracy.

The principle of the second method is the same as that of the first method, but the algebraic description is used to replace the geometric description, and the expression of the forward-scattering Doppler-shift of the target with respect to the parameters such as the target motion time, the transceiver line crossing moment, the position of the crossing point and the heading angle, are directly established by $$f_d(t) = \frac{1}{\lambda}\left[\frac{v^2(t_c - t) + (d - d_{CR})v\cos\alpha}{\sqrt{(d - d_{CR})^2 + v^2(t_c - t)^2 + 2(d - d_{CR})v(t_c - t)\cos\alpha}} + \right.$$

-continued $$\left.\frac{v^2(t_c - t) - d_{CR}v\cos\alpha}{\sqrt{d_{CR}^2 + v^2(t_c - t)^2 - 2d_{CR}v(t_c - t)\cos\alpha}}\right],$$

where t is the target motion time, $t_c$ is the transceiver line crossing moment, d is the length of the transceiver line, $d_{CR}$ is the horizontal distance from the receiver to the intersection point, $\alpha$ is the angle between the target heading direction and the transceiver line. The outstanding advantage of this method is that it can directly describe the dependence of the forward-scattering Doppler-shift on various parameters, and directly depicts the evolution process of the Doppler-shift with respect to target motion time, even more does not need the target heading angle record. However, it is only suitable for the case where the target trajectory is linear, not for the irregular trajectory cases.

At present, there is no method to calculate the forward-scattering Doppler-shift of a submerged target intruding the transceiver line in an irregular trajectory.

SUMMARY

The purpose of the invention is to solve the above defects in the prior art and to provide a calculation method for the acoustic forward-scattering Doppler-shift of a submerged target intruding the transceiver line in an irregular trajectory.

The technical scheme adopted by the this invention to solve the technical problem is: the method for calculating forward acoustic scattering doppler frequency shift of underwater moving target under irregular trajectory including (1) Convert the earth longitude and latitude coordinates of the transmitter, the target trajectory and the receiver into Cartesian coordinates, and mark them as $(x_S, y_S)$, $(x_T, y_T)$, and $(x_R, y_R)$, respectively.

(2) Denote the target trajectory sequence as $(x_T(t_i), y_T(t_i))$, $i=1, 2, \ldots, N$, and calculate the average velocity $\bar{v}$ in all intervals.

(3) Smooth the target trajectory to obtain the virtual linear trajectory, and calculate the respective horizontal distance from the target and the receiver to the intersection point of the virtual linear trajectory on the transceiver line, as well as the angle between the virtual linear trajectory and the transceiver line.

(4) Calculate the acoustic forward-scattering Doppler-shift of the target at each moment by using the parameters obtained in steps (2) and (3).

Further preferably, the smoothing method is realized as: a time window with a length of $l_w$ points is adopted to successively intercept the target trajectory sequence with a step $t_w$ points, and the arithmetically averaged trajectory coordinate within each window is regarded as the equivalent target trajectory coordinate in this interval. The smoothed target trajectory coordinates are given by $$\bar{x}_T(t_w) = \frac{1}{l_w}\sum_{t=t_w - \frac{l_w - 1}{2}}^{t_w + \frac{l_w - 1}{2}} x_T(t), \quad \bar{y}_T(t_w) = \frac{1}{l_w}\sum_{t=t_w - \frac{l_w - 1}{2}}^{t_w + \frac{l_w - 1}{2}} y_T(t).$$

Further preferably, the calculation method for the respective horizontal distance from the target and the receiver to the intersection point the virtual straight linear trajectory on the transceiver line is:

At moment $t_i$, the horizontal distance from the target to the intersection point $(\tilde{x}_C(t_i), \tilde{y}_C(t_i))$ of the virtual straight linear trajectory on the transceiver line is $$d_{TC}(t_i) = \sqrt{[\tilde{x}_T(t) - \tilde{x}_C(t)]^2 + [\tilde{y}_T(t) - \tilde{y}_C(t)]^2}.$$

The horizontal distance from the receiver to the intersection point can also be obtained:

$$d_{CR}(t_i) = \sqrt{[\tilde{x}_C(t_i) - x_R]^2 + [\tilde{y}_C(t_i) - y_R]^2}.$$

The horizontal distance from the current position of the target to the receiver is:

$$d_{TR}(t_i) = \sqrt{[\tilde{x}_T(t_i) - x_R]^2 + [\tilde{y}_T(t_i) - y_R]^2}.$$

Further preferably, the angle between the virtual linear trajectory and the transceiver line at moment $t_i$ is obtained from the Cosine Law:

$$\alpha(t_i) = \cos^{-1}\left[\frac{d_{TC}^2(t_i) + d_{CR}^2(t_i) - d_{TR}^2(t_i)}{2d_{TC}(t_i)d_{CR}(t_i)}\right].$$

Further preferably, the calculation method of the forward-scattering Doppler-shift includes:

At moment $t_i$, substitution of parameters $\bar{v}$, $d_{TC}(t_i)$, $d_{CR}(t_i)$, $\alpha(t_i)$, source frequency $f_c$ and sound speed $c$ into Doppler-shift model for linear trajectory gives:

$$f_d(t_i) = \frac{c}{f_c}\left[\frac{\bar{v}d_{TC}(t_i) + [d_{SR} - d_{TR}(t_i)]\bar{v}\cos\alpha(t_i)}{\sqrt{[d_{SR} - d_{TR}(t_i)]^2 + d_{TC}^2(t_i) + 2d_{TC}(t_i)[d_{SR} - d_{TR}(t_i)]\cos\alpha(t_i)}} + \frac{\bar{v}d_{TC}(t_i) - d_{TR}(t_i)\bar{v}\cos\alpha(t_i)}{\sqrt{d_{TR}^2(t_i) + d_{TC}^2(t_i) - 2d_{TC}(t_i)d_{TR}(t_i)\cos\alpha(t_i)}}\right].$$

The Doppler-shift curve with respect to the motion time is finally obtained by traversing all of the smoothed target trajectory points.

In present invention, the method for calculating forward acoustic scattering doppler frequency shift of underwater moving target under irregular trajectory has the following beneficial effects:

It solves the problem that the existing techniques cannot calculate the forward-scattering Doppler-shift when the target trajectory is irregular. The smoothing process is rigorous since it adopts azimuth sampling at equal time intervals and performs arithmetic mean calculation. The Cosine Law is used to estimate the angle between the virtual linear trajectory of the target and the transceiver line, and the horizontal distance between the target, the intersection point and the receiver is calculated strictly according to geometric relations. Strict parametric equations are utilized to calculate the forward-scattering Doppler-shift, and the results are accurate.

DESCRIPTION OF THE EMBODIMENTS

In order for better understanding of the invention, detailed descriptions are listed in combination with the accompanying pictures and preferred embodiments. However, the present invention can be implemented in many other forms and is not limited to the embodiments described in this specification. Moreover, the purpose of providing these embodiments is to make the understanding of the disclosure of the invention more thorough and comprehensive.

Embodiment 1

Figure 1:
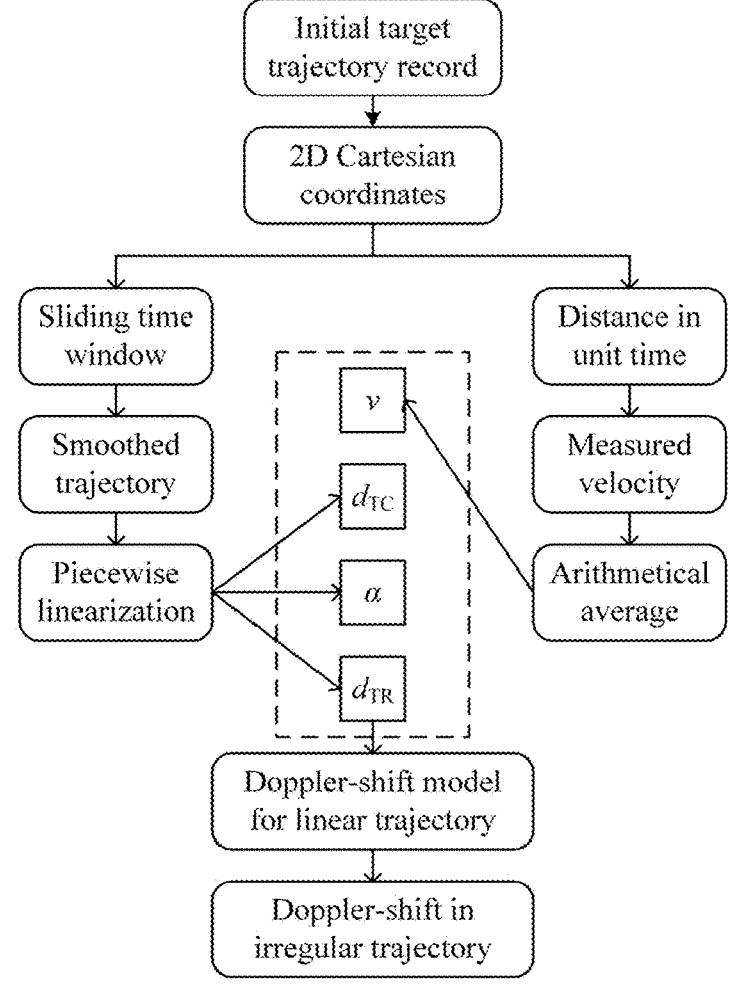
FIG. 1 Flow chart of the forward acoustic scattering doppler frequency shift calculation method in present invention.

The process of the method for calculating forward acoustic scattering doppler frequency shift of underwater moving target under irregular trajectory provided by the invention is shown in FIG. 1, which specifically includes the following steps (1) Coordinate Transformation Select an appropriate reference position as the origin in the two-dimensional plane to establish Cartesian coordinate system, convert the earth longitude and latitude coordinates of the transmitter, the receiver and the target trajectory into Cartesian coordinates, and mark them as $(x_S, y_S)$, $(x_T, y_T)$ and $(x_R, y_R)$, respectively. The length of the transceiver line can be obtained as:

$$d_{SR} = \sqrt{(x_S - x_R)^2 + (y_S - y_R)^2}. \tag{1}$$

(2) Target Speed Estimation

Denoting the target trajectory sequence by $(x_T(t_i), y_T(t_i))$, $i=1, 2, \ldots, N$, the target velocity between any two adjacent moments $t_i$ and $t_{i+1}$ can be expressed by:

$$v_i = \frac{\sqrt{[x_T(t_{i+1}) - x_T(t_i)]^2 + [y_T(t_{i+1}) - y_T(t_i)]^2}}{t_{i+1} - t_i}, i = 1, 2, \ldots N-1. \tag{2}$$

The arithmetically averaged value of the velocity in all intervals is obtained as $$\bar{v} = \frac{1}{N-1}\sum_{i=1}^{N-1}v_i. \tag{3}$$

This averaged velocity $\overline{v}$ is adopted as the target velocity in calculating the forward-scattering Doppler-shift.

(3) Estimation of Smoothed Target Trajectory Coordinates

A time window with a length of $l_w$ points is adopted to successively intercept the target trajectory sequence with a step $t_w$ points, and the arithmetically averaged trajectory coordinate within each window is regarded as the equivalent target trajectory coordinate in this interval. In this way, the initial target trajectory is totally smoothed to reduce the effect from the violent swing of the target trajectory in local intervals. The smoothed target trajectory coordinates are given by $$\tilde{x}_T(t_w) = \frac{1}{l_w} \sum_{t=t_w-\frac{l_w-1}{2}}^{t_w+\frac{l_w-1}{2}} x_T(t), \quad \tilde{y}_T(t_w) = \frac{1}{l_w} \sum_{t=t_w-\frac{l_w-1}{2}}^{t_w+\frac{l_w-1}{2}} y_t(t). \tag{4}$$

(4) Estimation of the Intersection Point Coordinate

Figure 2:
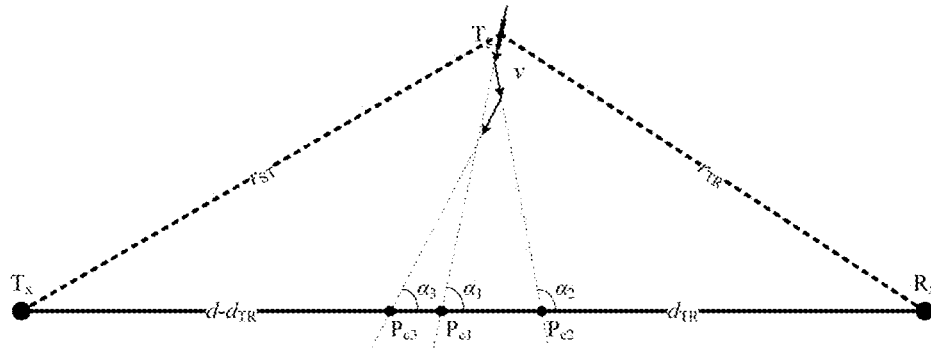
FIG. 2 Schematic diagram of piecewise linear approximation of target trajectory

Piecewise linear approximation is applied to the smoothed target trajectory, that is, the target trajectory of at any two adjacent moments $t_i$ and $t_{i+1}$ is assumed to be linear as is shown by FIG. 2. This virtual linear trajectory must intersect with the transceiver line at a certain point. Obviously, the intersection position on the transceiver line is not unique during the target intrusion course.

At $t_i$ and $t_{i+1}$, by using the target trajectory coordinates $(\tilde{x}_T(t_i), \tilde{y}_T(t_i))$ and $(\tilde{x}_T(t_{i+1}), \tilde{y}_T(t_{i+1}))$, the linear equation for the target trajectory in this interval can be directly expressed as:

$$y = \frac{\tilde{y}_T(t_i) - \tilde{y}_T(t_{i+1})}{\tilde{x}_T(t_i) - \tilde{x}_T(t_{i+1})} x + \frac{\tilde{y}_T(t_{i+1})\tilde{x}_T(t_i) - \tilde{y}_T(t_i)\tilde{x}_T(t_{i+1})}{\tilde{x}_T(t_i) - \tilde{y}_T(t_{i+1})}. \tag{5}$$

At the same time, the linear equation for the transceiver line can also be directly obtained from the Cartesian coordinates of the transmitter and the receiver:

$$y = \frac{y_R - y_S}{x_R - x_S} x + \frac{y_S x_R - y_R x_S}{x_R - x_S}. \tag{6}$$

Combination of Eqs. (5) and (6) gives the coordinates of the intersection point between the virtual linear trajectory and the transceiver line at moment $t_i$:

$$\tilde{x}_C(t_i) = \frac{(x_R - x_S)[\tilde{y}_T(t_{i+1})x_T(t_i) - \tilde{y}_T(t_i)\tilde{x}_T(t_{i+1})] - (y_S x_R - y_R x_S)[\tilde{x}_T(t_i) - \tilde{x}_T(t_{i+1})]}{(y_R - y_S)[\tilde{x}_T(t_i) - \tilde{x}_T(t_{i+1})] - (x_R - x_S)[\tilde{y}_T(t_i) - \tilde{y}_T(t_{i+1})]}, \tag{7}$$

$$\tilde{y}_C(t_i) = \frac{(y_R - y_S)[\tilde{y}_T(t_{i+1})\tilde{x}_T(t_i) - \tilde{y}_T(t_i)\tilde{x}_T(t_{i+1})] - (y_S x_R - y_R x_S)[\tilde{y}_T(t_i) - \tilde{y}_T(t_{i+1})]}{(y_R - y_s)[\tilde{x}_T(t_i) - \tilde{x}_T(t_{i+1})] - (x_R - x_S)[\tilde{y}_T(t_i) - \tilde{y}_T(t_{i+1})]}. \tag{8}$$

(5) Estimation of the Horizontal Distances

The horizontal distance from the target to the intersection point $(\tilde{x}_C(t_i), \tilde{y}_C(t_i))$ at moment $t_i$ can be obtained as:

$$d_{TC}(t_i) = \sqrt{[\tilde{x}_T(t) - \tilde{x}_C(t)]^2 + [\tilde{y}_T(t) - \tilde{y}_C(t)]^2}. \tag{9}$$

The horizontal distance from the receiver to the intersection point at the same time can also be given:

$$d_{CR}(t_i) = \sqrt{[\tilde{x}_C(t_i) - x_R]^2 + [\tilde{y}_C(t_i) - y_R]^2}. \tag{10}$$

The horizontal distance from the current position of the target to the receiver is:

$$d_{TR}(t_i) = \sqrt{[\tilde{x}_T(t_i) - x_R]^2 + [\tilde{y}_T(t_i) - y_R]^2}. \tag{11}$$

(6) Angle Estimation Between the Virtual Linear Trajectory and the Transceiver Line At moment $t_i$, application of the Cosine Law to Eqs. (9), (10) and (11) gives the estimated angle $$\alpha(t_i) = \cos^{-1}\left[\frac{d_{TC}^2(t_i) + d_{TR}^2(t_i) - r_{TR}^2(t_i)}{2d_{TC}(t_i)d_{TR}(t_i)}\right]. \tag{12}$$

(7) Estimation of the Forward-Scattering Doppler-Shift

At moment $t_i$, substitution of parameters $\overline{v}$, $d_{TC}(t_i)$, $d_{CR}(t_i)$, $\alpha(t_i)$, source frequency $f_c$ and sound speed $c$ into Doppler-shift model for linear trajectory gives:

$$f_d(t_i) = \tag{13}$$
$$\frac{c}{f_c}\left[\frac{\overline{v}d_{TC}(t_i) + [d_{SR} - d_{CR}(t_i)]\overline{v}\cos\alpha(t_i)}{\sqrt{[d_{SR} - d_{CR}(t_i)]^2 + d_{TC}^2(t_i) + 2d_{TC}(t_i)[d_{SR} - d_{CR}(t_i)]\cos\alpha(t_i)}} + \frac{\overline{v}d_{TC}(t_i) - d_{CR}(t_i)\overline{v}\cos\alpha(t_i)}{\sqrt{d_{CR}^2(t_i) + d_{TC}^2(t_i) - 2d_{CR}(t_i)d_{TC}(t_i)\cos\alpha(t_i)}}\right].$$

Traverse all the smoothed target trajectory points, and execute calculation steps (4)-(7) successively to obtain the forward-scattering Doppler-shift of the target at each moment, finally obtains the corresponding Doppler-shift curve with respect to the target motion time.

Embodiment 2

Figure 3:
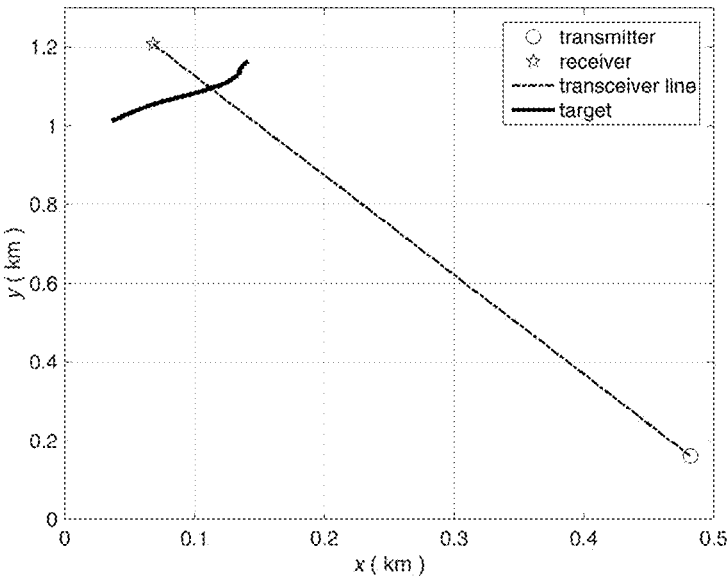
FIG. 3 Positions of the transmitter, receiver and target trajectory in a lake experiment FIG. 4 Segmented estimation results of target velocity FIG. 5 Target trajectories before and after smoothing FIG. 6 Distribution of the intersection points on the transceiver line FIG. 7 Horizontal distance from the target to the intersection points FIG. 8 Horizontal distance from the receiver to the intersection points FIG. 9 Angles between the virtual linear trajectory and the transceiver line FIG. 10 Forward-scattering Doppler-shift of a submerged intruding target FIG. 11 Forward-scattering Doppler-shift comparisons between the calculated result and experimental data

The algorithm proposed in present invention is validated by using the target trajectory and the extracted forward-scattering Doppler-shift data, which are both collected in a lake experiment. In the experiment, the transmitter and the receiver were separated about 1100 m apart. The target is a double-layered aluminum plate assembly with foam interlayer (without automatic power), which is towed crossing the transceiver line by a boat through a 10 m length flexible rope. The positions of the transmitter, the receiver and target trajectory are shown in FIG. 3. In the test, the center frequency $f_c$ of the source signal is around 10 KHz. The sound speed of the test water layer is approximately constant with a value $c \approx 1485$ m/s. Affected by wind and current, the boat swings significantly and the target trajectory is not linear. A portable GPS device was used to record the true trajectory positions of the tow boat, and the sampling interval was 1 second.

(1) Target Velocity Estimation

Figure 4:
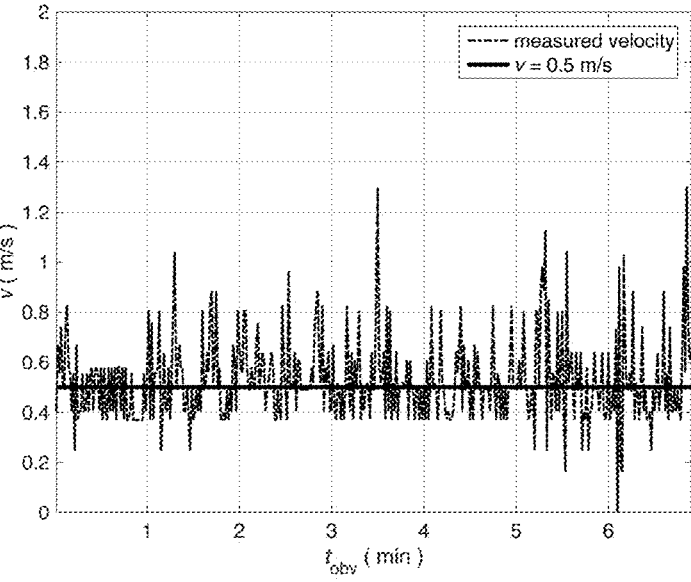

Eqs. (2) and (3) are successively applied to the target trajectory sequence in FIG. 3, and the speed estimation results are shown in FIG. 4. The dotted line represents the measured tow boat velocity where the velocity fluctuation originates from tow boat swinging. The solid line denotes the arithmetic average 0.5 m/s, which is taken as the target's moving velocity.

(2) Target Trajectory Smoothing

Figure 5:
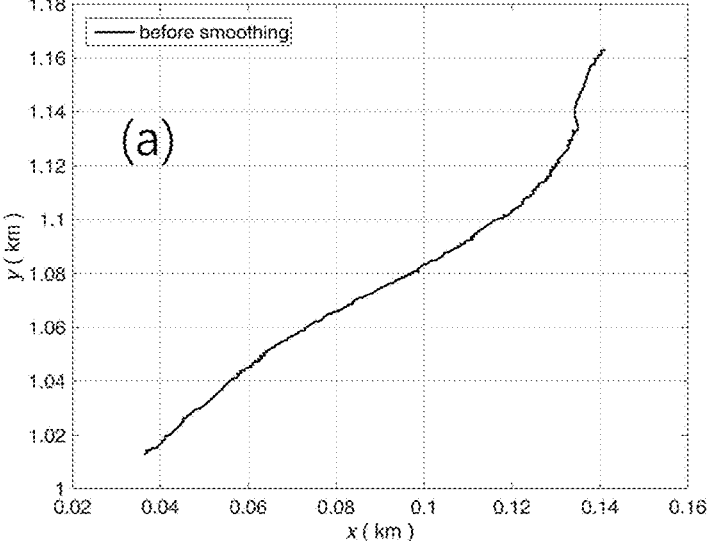
Figure 5:
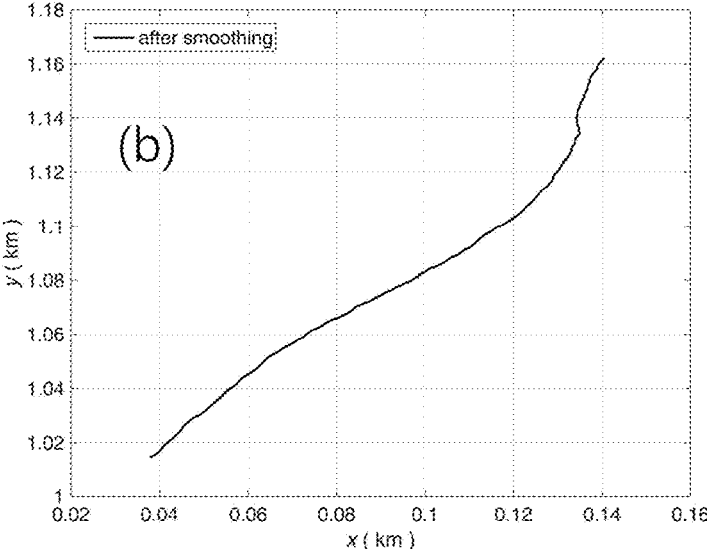

A rectangular window with a length of 5 s is used to slide and intercept the tow boat position sequence in a step of 3 s. The arithmetic average of the 5 intercepted positions is taken as the position of the target, so as to smooth the initial trajectory. FIGS. 5(*a*) and (*b*) show the trajectories before and after smoothing, respectively. It can be seen that local oscillations are reduced by trajectory smoothing. As mentioned earlier, since the target is connected with the tow boat through flexible rope, the smoothed trajectory can be regarded as the target trajectory.

(3) Distribution of the Intersection Points on the Transceiver Line

Figure 6:
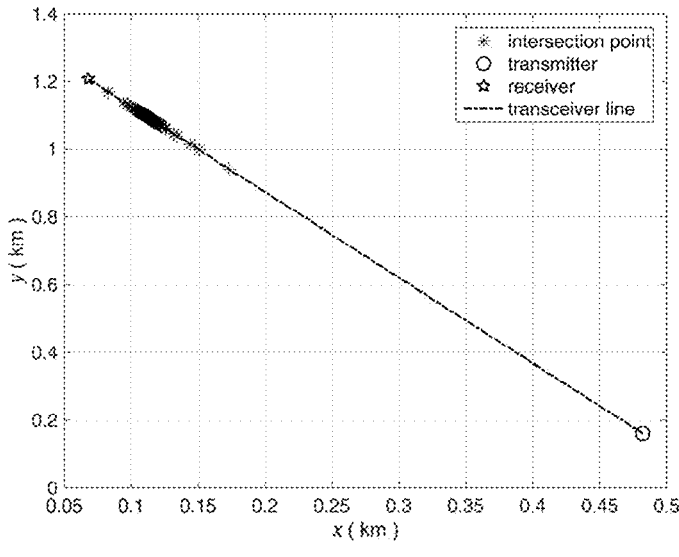

FIG. 6 shows the distribution of the intersection points (marked by "*") on the transceiver line by using the target trajectory in FIG. 5 through Eqs. (7) and (8). Since the target trajectory is a linear, the intersection position of the virtual trajectory on the transceiver line at each moment is different from the real crossing position after piecewise linear approximation. But, most of these virtual intersection points are gathered around the actual crossing position.

(4) Horizontal Distance from the Target to the Intersection Point

Figure 7:
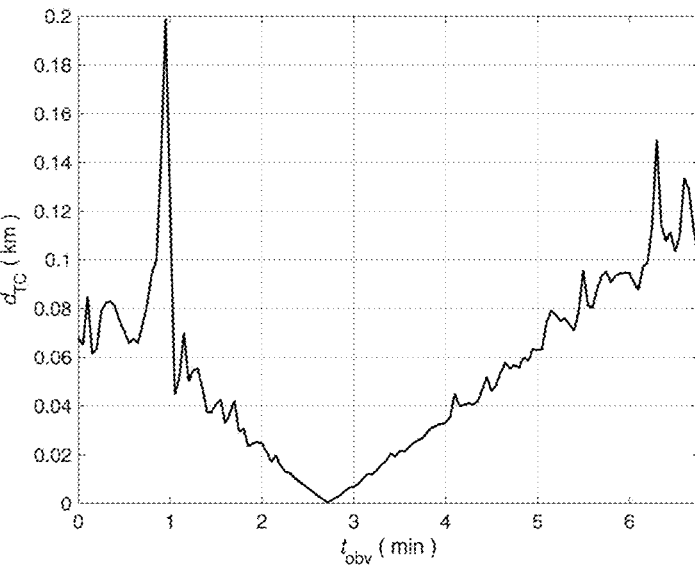

FIG. 7 shows the horizontal distance from the target to the intersection point calculated from Eq. (9) during the total course. Obviously, the greater the deviation of the virtual intersection points from the actual crossing point, the greater the value of $d_{TC}$. But the overall trajectory evolving tendency is clear. Especially when the target is near the transceiver line, the distance fluctuation is small.

(5) Horizontal Distance from the Receiver to the Intersection Point

Figure 8:
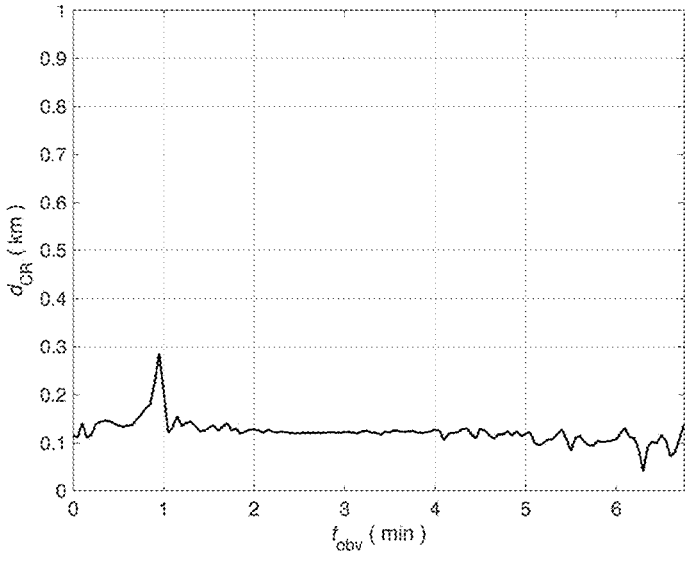

The result calculated by Eq. (10) is shown in FIG. 8. The variation tendency of the horizontal distance from the receiver to the virtual crossing point on the transceiver line is consistent with the distribution form of the intersection point in FIG. 7. Comparing FIG. 8 and FIG. 7, it is seen that the closer the target position is to the transceiver line, the smaller the fluctuation of each distance parameter.

(6) The Angle Between the Virtual Linear Trajectory and the Transceiver Line

Figure 9:
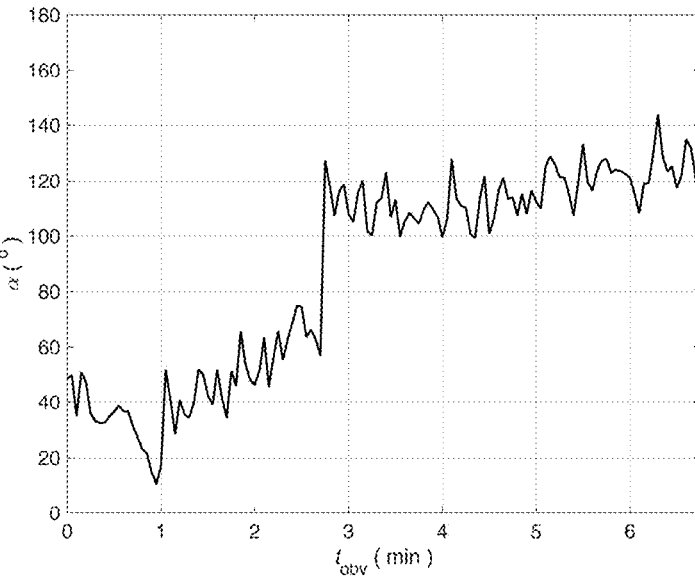

FIG. 9 shows the angle information between the target virtual linear trajectory and the transceiver line calculated by Eq. (12). When the target just crosses over the transceiver line, the angle skips to its supplementary angle. Therefore, there exists a certain angle-jump. The farther the target heading deviates from the normal of the transceiver line ($\alpha=90°$), the greater the angle-jump. However, the angle-jump here does not affect the calculation result of the forward-scattering Doppler-shift.

(7) Calculation of the Forward-Scattering Doppler-Shift

The parameters extracted from the actual target trajectory record $\bar{v}$, $d_{TC}(t_i)$, $d_{CR}(t_i)$, $\alpha(t_i)$, together with source frequency $f_c$ and sound speed c are substituted into Eq. (13), and the obtained forward-scattering Doppler-shift curve is show in FIG. 10.

(8) Comparison of Numerical Calculation and Data Analysis Results

Since the positions of the transmitter and receiver are fixed, the Doppler-shift of the direct-blast is zero. There is a time-varying Doppler-shift in the forward-scattered wave of a submerged target when it crosses the transceiver line.

However, the forward-scattered wave always interferes with the direct-blast. The final effect is causing the low-frequency modulation in the received wave. Extracting the envelope of the received signal and performing time-frequency analysis on the envelope, the Doppler-shift fringes are obtained and shown in FIG. 11. The "V"-shaped Doppler-shift fringe corresponds to the target crossing the transceiver line, while the horizontal fringe with nearly zero Doppler-shift corresponds to the direct-blast.

Figures 10, 11:
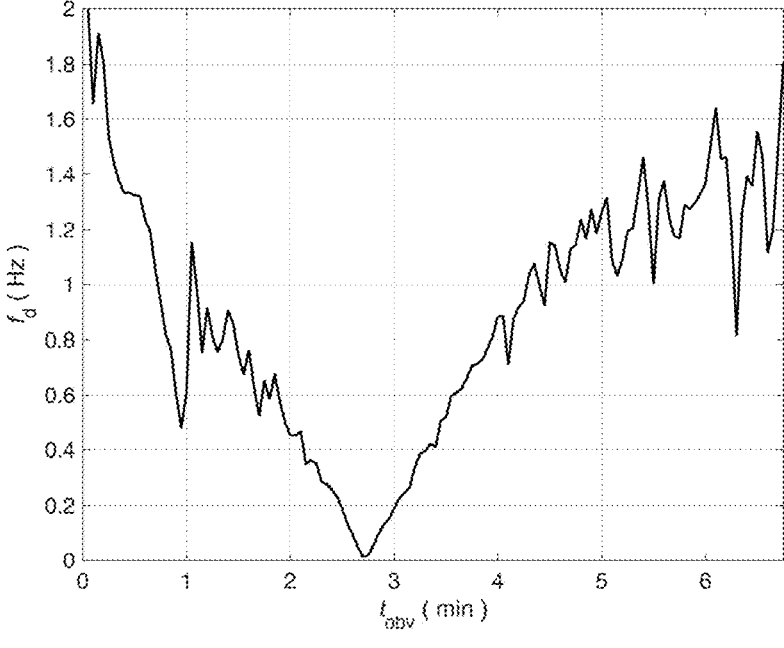

The Doppler-shift curve obtained by this method is shown by the dot-dash line in FIG. 11. The Doppler-shift range and variation tendency represented by this curve are consistent with the Doppler frequency shift fringes obtained by data analysis. The results confirm that the feasibility of the method proposed the present invention.

What is claimed is:

1. A method for calculating the forward acoustic scattering doppler frequency shift of an underwater moving target under irregular trajectory is characterized by comprising:

(1) converting earth longitude and latitude coordinates of a transmitter, a irregular trajectory of the underwater moving target under irregular trajectory and a receiver into Cartesian coordinates, and marking as $(x_S, y_S)$, $(x_T, y_T)$, and $(x_R, y_R)$, respectively, and designating a baseline connecting the transmitter and receiver as a transceiver line;

(2) denoting a target trajectory sequence of the underwater moving target under irregular trajectory as $(x_T(t_i), y_T(t_i))$, $i=1, 2, \ldots, N$, and directly calculating a motion velocity $\bar{v}$ of the underwater moving target under irregular trajectory between any two adjacent moments $t_i$ and $t_i+1$;

$$v_i = \frac{\sqrt{[x_T(t_{i+1}) - x_T(t_i)]^2 + [y_T(t_{i+1}) - y_T(t_i)]^2}}{t_{i+1} - t_i}, i = 1, 2, \ldots N - 1,$$

calculating an arithmetic average of the velocities in all time periods to obtain $$\bar{v} = \frac{1}{N-1} \sum_{i=1}^{N-1} v_i;$$

(3) smoothing the target trajectory of the underwater moving target under the irregular trajectory, and performing piecewise linear approximation on the smoothed target trajectory of the underwater moving target under irregular trajectory so that a motion trajectory of the underwater moving target under irregular trajectory between any two adjacent moments ti and ti+1 is a straight line, and using the straight line as a virtual straight line trajectory, calculating horizontal distances from the underwater moving target under irregular trajectory and the receiver to an intersection point of the target trajectory of the underwater moving target under irregular trajectory on the transceiver line, and an included angle between the virtual straight line trajectory and the transceiver line; wherein the smoothing is performed using a smoothing method, the smoothing method comprising using a time window with a length of $l_w$ points to successively intercept the target trajectory sequence with a step of $t_w$ points, and regarding an arithmetic mean of trajectory coordinates within each window as the equivalent target trajectory coordinate in the interval and the smoothed target trajectory coordinates are given by the following formula:

$$\tilde{x}_T(t_w) = \frac{1}{l_w} \sum_{t=t_w-\frac{l_w-1}{2}}^{t_w-\frac{l_w-1}{2}} x_T(t), \ \tilde{y}_T(t_w) = \frac{1}{l_w} \sum_{t=t_w-\frac{l_w-1}{2}}^{t_w+\frac{l_w-1}{2}} y_T(t);$$

(4) calculating the acoustic forward-scattering Doppler-shift of the underwater moving target under irregular trajectory at each moment by using the parameters obtained in steps (2) and (3).

2. The method according to claim 1, the method for calculating the forward acoustic scattering doppler frequency shift of an underwater moving target under irregular trajectory is characterized by the calculation method further comprising a method of calculating respective horizontal distance from the target and the receiver to the intersection point of the virtual straight line trajectory on the transceiver line;

at moment $t_i$, the horizontal distance from the target to the intersection point $(\tilde{x}_C(t_i), \tilde{y}_C(t_i))$ of the virtual straight linear trajectory on the transceiver line is $$d_{TC}(t_i) = \sqrt{[\tilde{x}_T(t) - \tilde{x}_C(t)]^2 + [\tilde{y}_T(t) - \tilde{y}_C(t)]^2} \ ;$$

the horizontal distance from the receiver to the intersection point can also be calculated by:

$$d_{CR}(t_i) = \sqrt{[\tilde{x}_C(t_i) - x_R]^2 + [\tilde{y}_C(t_i) - y_R]^2} \ ;$$

the horizontal distance from the current position of the target to the receiver is:

$$d_{TR}(t_i) = \sqrt{[\tilde{x}_T(t_i) - x_R]^2 + [\tilde{y}_T(t_i) - y_R]^2} \ ;$$

3. The method according to claim 2, the method for calculating the forward acoustic scattering doppler frequency shift of an underwater moving target under irregular trajectory is characterized by the calculation method of the included angle between the virtual straight line trajectory and the transceiver line; at moment $t_i$, the included angle is obtained from the Cosine Law:

$$\alpha(t_i) = \cos^{-1}\left[\frac{d_{TC}^2(t_i) + d_{CR}^2(t_i) - d_{TR}^2(t_i)}{2d_{TC}(t_i)d_{CR}(t_i)}\right].$$

4. The method according to claim 3, the method for calculating the forward acoustic scattering doppler frequency shift of an underwater moving target under irregular trajectory is characterized by the calculation method for the acoustic forward-scattering Doppler-shift of the target;

at moment $t_i$, substitution of parameters $\bar{v}$, $d_{TC}(t_i)$, $d_{CR}(t_i)$, $\alpha(t_i)$, source frequency $f_c$ and sound speed $c$ into Doppler-shift model for linear trajectory gives:

$$f_d(t_i) = \frac{c}{f_c}\left[\frac{\bar{v}d_{TC}(t_i) + [d_{SR} - d_{CR}(t_i)]\bar{v}\cos\alpha(t_i)}{\sqrt{[d_{SR} - d_{CR}(t_i)]^2 + d_{TC}^2(t_i) + 2d_{TC}(t_i)[d_{SR} - d_{CR}(t_i)]\cos\alpha(t_i)}} + \right.$$
$$\left.\frac{\bar{v}d_{TC}(t_i) - d_{CR}(t_i)\bar{v}\cos\alpha(t_i)}{\sqrt{d_{CR}^2(t_i) + d_{TC}^2(t_i) - 2d_{CR}(t_i)d_{TC}(t_i)\cos\alpha(t_i)}}\right];$$

the Doppler-shift curve with respect to the motion time is finally obtained by traversing all of the smoothed target trajectory points.

* * * * *